May 14, 1963 L. S. PRZYBYLOWICZ 3,089,238
DOUGH CUTTING DEVICE
Filed Aug. 7, 1961

INVENTOR.
LEO S. PRZYBYLOWICZ
BY
WILSON, SETTLE & CRAIG
ATTORNEYS

United States Patent Office 3,089,238
Patented May 14, 1963

3,089,238
DOUGH CUTTING DEVICE
Leo S. Przybylowicz, 7334 Fielding, Detroit, Mich.
Filed Aug. 7, 1961, Ser. No. 129,722
7 Claims. (Cl. 30—130)

This invention relates to a dough cutting device and more particularly to a dough cutting device particularly adapted to cutting doughnuts or rolls at a high rate of speed while maintaining regular and evenly cut shapes.

Many devices have been proposed in the past for cutting doughnuts, jelly rolls and the like on a mass production basis. Two problems have presented themselves in the prior art devices. One problem has been to obtain an effective release of the dough after the shape has been formed. A second problem has been to provide a cutting action which will produce a regular and even shape. The present invention provides a novel cutter construction which effectively solves both of these problems.

It is an object of the invention to provide a dough cutter capable of cutting shapes in dough at a high rate of speed.

A further object of the invention is to provide resilient means for mounting the dough cutter in such a way that the cutting action will proceed from the leading edge of the cutter to the trailing edge and will be substantially complete before the cutter is removed from the dough to result in an even and regular shape.

Another object is to remove the cutter from the shaped dough in such a manner as to avoid damaging the shaped article.

Another object of the invention is to provide a cutter construction which employs a detachable cutter element for cutting the center hole in a doughnut, the cutter element being removable when it is desired to cut a roll without a center hole.

A still further object of the invention is to provide a cutter element for cutting the center hole in a doughnut having an ejection mechanism to eject the dough which is cut from the center after being removed from the shaped doughnut.

Other objects of this invention will appear in the following description and appended claims, reference being had to the accompanying drawing forming a part of this specification wherein like reference characters designate corresponding parts in the several views.

Figure 1:
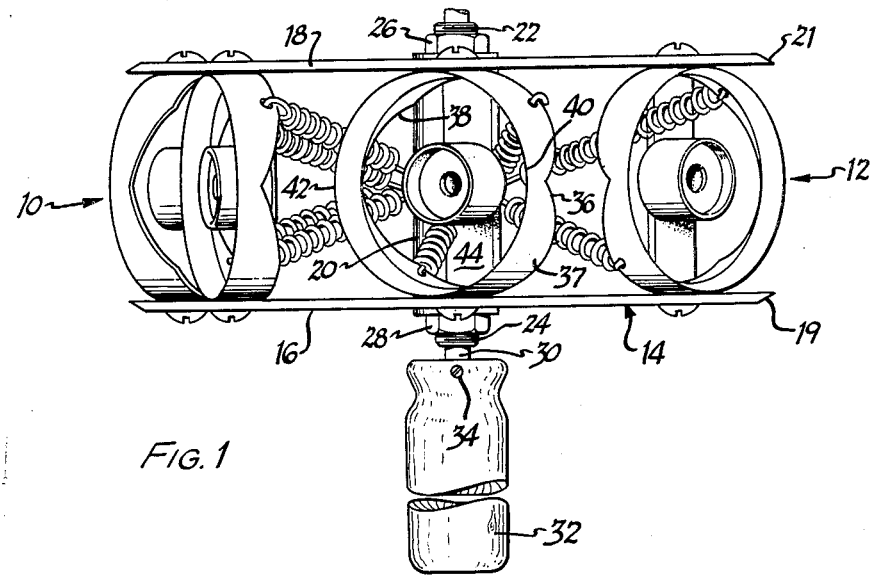
FIGURE 1 is a top plan view of one embodiment of the dough cutting device of the present invention.
Figure 2:
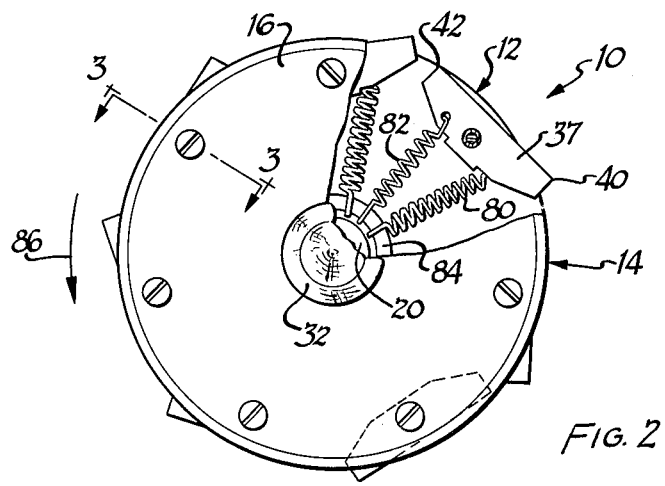
FIGURE 2 is a side elevational view of the FIGURE 1 device with portions broken away for the purpose of clarity.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to the figures, it will be seen that the dough cutting device 10 comprises a plurality of dough cutters 12 resiliently mounted within a circular housing 14. The housing 14 is adapted to be rolled over a sheet of dough whereupon the cutters 12 will perform the desired cutting action.

The housing 14 includes a pair of circular discs 16, 18 which are spaced apart and secured in place by a cylindrical sleeve 20. The outer peripheral edges 19, 21 of the discs are wedge-shaped so that the discs will cut a path through a sheet of dough when rolled thereover to thus avoid compressing and deforming the sheet of dough adjacent the outer edges of the housing during a cutting operation. The sleeve 20 is mounted between the discs at the center thereof. The sleeve has hollow threaded portions 22, 24 which extend through openings in the discs. Nut structures 26, 28 threadingly engage the portions 22, 24 to secure the assembly together.

A rod 30 is journaled in the sleeve 20. The rod 30 acts as an axle for the housing 14. Portions of the rod 30 extend exteriorly of the discs 16, 18. A pair of handles 32 (only one of which is shown) are mounted on the exterior portions of the rod 30 and secured in place by set screws 34.

In the embodiment shown, seven circumferentially spaced cutters 12 are resiliently mounted between the discs 16, 18 adjacent the outer periphery thereof. However, it will be appreciated that more or less than seven cutters may be provided as desired. Each of the cutters comprises a circular ring 37 having wedge-shaped cutting edge 39. Diametrically opposed V-shaped notches 36, 38 are formed in the ring. The apex of notch 36 terminates adjacent the trailing cutting edge 40 and the apex of notch 38 terminates adjacent the leading cutting edge 42. This arrangement provides clearance for pivoting of the cutters.

Figure 3:
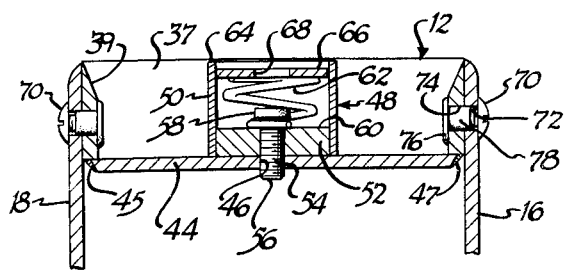
FIGURE 3 is a sectional view of the cutter element taken substantially along the line 3—3 looking in the direction of the arrows.

A support member 44 extends across the back side of the cutter and is secured thereto as by welding at 45, 47. Each support member 44 has a threaded opening 46 provided in the center thereof. The threaded openings receive detachable doughnut hole cutter elements 48. As best seen in FIGURE 3, the hole cutters 48 comprise a thin-wall circular sleeve 50 having a relatively thick plug 52 secured in one end. The plug 52 structurally supports the sleeve 50 and also acts to mount a dough ejection mechanism in the hole cutter. The plug 52 threadingly receives a screw 54 which extends therethrough and has a portion 56 extending outwardly therefrom. The portion 56 threadingly engages the opening 46 of the support 44 to detachably secure the hole cutter to the dough cutter 12. The hole cutters may be mounted on the reverse side of element 44 when not in use. The head 58 of the screw 54 extends above the surface 60 of the plug. One end of a coil spring 62 is secured to the head portion of the screw. The spring 62 extends from the plug 52 towards the cutting edge 64 but terminates at a point short thereof. A disc 66 is received in the sleeve 50 and is secured to the spring 62. As will be noted, the disc is positioned within the sleeve a short distance from the cutting edge 64.

In operation of the hole cutter 48, the dough which is cut is forced into the sleeve 50 depressing the spring 62. When the hole cutter is removed from the main body of dough, the spring 62 ejects the dough which is within the hole cutter to thus prepare the cutter for another cutting operation. In practice, one or two pieces of dough may remain in the hole cutter. However, the force of spring 62 is sufficient to begin ejecting pieces of dough before the interior of the hole cutter is filled. An opening 68 is provided in the disc 66 to permit escape of air past the disc when the disc is depressed.

The cutters 12 are pivotally mounted between the discs 16, 18 by means of oppositely disposed screws 70 which extend through openings 72, 74 provided in the discs and cutters into threading engagement with nuts 76. The nuts 76 have a sleeve portion 78 which acts as a bushing.

Each of the cutters 12 is biased by means of a pair of diametrically opposed coil springs 80, 82. One end of each spring is hooked through an opening in the cutter and the other end extends into hooking engagement with a ring 84 provided on the sleeve 20. It will be noted that the ring 84 has an internal diameter larger than the external diameter of the sleeve. This provides a clearance for the attachment of the springs. One of the springs 80 is longer than the other spring 82 while both springs have substantially the same spring force. This arrangement biases the cutters so that the trailing edge 40 extends exteriorly of the discs 16, 18 while the leading edge 42 is positioned within the structure defined by the discs. After each cutting operation, the cutters return to this position in preparation for the next succeeding cut. The resilient mounting means for the cutters is preferably as shown. However, it will be appreciated that other means may be used. For example, two springs having different spring forces could be effective to cant the cutters. Also, the cutters could be mounted on a block of resilient material, such as rubber, and the block mounted within the housing at an angle to cant the cutters. This structure would avoid the necessity for pivotally mounting the cutters.

In operation of the device, the handles 32 are grasped and the device is rolled over a sheet of dough in the arrow 86 direction. The leading edge 42 will first contact the dough and begin the cutting operation. When the edge 42 meets sufficient resistance from the dough, the forced exerted thereon will deflect the springs 80, 82 and cause the cutter to be pivoted. The pivoting will bring successive portions of the cutter into contact with the dough until finally the trailing edge 40 will contact the dough to complete the cut. During this action, the hole cutter (if being used) is also cutting a hole in the center to form a doughnut. When the entire cut has been made, the discs 16, 18 will have moved to a point where the trailing edge 40 can begin to rise from the dough. The springs 80, 82 will cause the trailing edge to be snapped out of the dough. As will be appreciated, this snapping action will eject the formed article from the cutter. After the cut has been completed and the cutter 12 is retracted from the dough, the hole cutter 48 will eject the dough trapped therein.

Because of the pivoting of the cutter 12, the cutter does not move forward nor are portions of the cutter retracted from the dough until the cut has been completed. This cutting action results in a pastry shape which is regular in form and which has evenly cut edges.

Various modifications of the structure are possible. For example, other dough cutter shapes may be used. Further, the device may be machine driven rather than hand operated. It would also be possible to provide a bank of side by side devices to cut additional pastry shapes during each cutting operation.

Having thus described by invention, I claim:

1. A dough cutting device comprising a housing adapted to be rolled over a sheet of dough; a plurality of circumferentially spaced dough cutters resiliently mounted in said housing adjacent the outer periphery thereof; each of said cutters comprising a ring-like element forming a continuous cutting edge to cut a dough article in the shape of said element; each of said cutters having a leading cutting edge and a trailing edge; said trailing cutting edge being normally spaced further from the center of the housing than the leading cutting edge whereby when the device is rolled over a sheet of dough, the cutting action will proceed from the leading edge of each cutter to the trailing edge thereof, said resilient mounting means deforming during cutting to accommodate the progressive cutting of dough from the leading cutting edge to the trailing cutting edge and subsequently returning each cutter to its normal position with a snap action to eject the shaped dough article.

2. A dough cutting device comprising a housing adapted to be rolled over a sheet of dough; a plurality of circumferentially spaced dough cutters pivotally mounted in said housing adjacent the outer periphery thereof; each of said cutters comprising a ring-like element forming a continuous cutting edge to cut a dough article in the shape of said element; each of said cutters having a leading cutting edge and a trailing cutting edge; biasing means to normally space the trailing cutting edge further from the center of the housing than the leading cutting edge whereby when the device is rolled over a sheet of dough, the leading edge of the cutter will contact the dough first and the cutter will thereafter pivot, causing the cutting action to proceed from the leading edge to the trailing edge, said biasing means deforming during cutting to accommodate the progressive cutting of dough from the leading edge to the trailing edge and acting to eject the shaped article after the cutting has been completed.

3. A dough cutting device comprising a housing adapted to be rolled over a sheet of dough; a plurality of circumferentially spaced dough cutters resiliently mounted in said housing adjacent the outer periphery thereof; each of said cutters comprising a ring-like element forming a continuous cutting edge to cut a dough article in the shape of said element; a doughnut hole cutter element detachably mounted in the center of each dough cutter; each of said dough cutters having a leading cutting edge and a trailing cutting edge; said trailing cutting edge being normally spaced further from the center of the housing than the leading cutting edge whereby when the device is rolled over a sheet of dough, the cutting action will proceed from the leading edge of each cutter to the trailing edge thereof; said resilient mounting means deforming during cutting to accommodate the progressive cutting of dough from the leading edge to the trailing edge and acting to eject the shaped article subsequent to cutting.

4. A device as claimed in claim 3 and further characterized in that said doughnut hole cutter is provided with an ejection mechanism to automatically eject dough trapped therein after each cutting action.

5. A dough cutting device comprising a housing adapted to be rolled over a sheet of dough, a plurality of circumferentially spaced dough cutters pivotally mounted in said housing adjacent the outer periphery thereof; each of said cutters comprising a ring-like element forming a continuous cutting edge to cut a dough article in the shape of said element; each of said cutters having a leading cutting edge and a trailing cutting edge; spring means normally biasing the trailing cutting edge further from the center of the housing than the leading cutting edge whereby when the device is rolled over a sheet of dough, the cutting action will proceed from the leading edge of each cutter to the trailing edge thereof; said spring means deforming to accommodate the progressive cutting of dough from the leading edge to the trailing edge and subsequently pivoting each dough cutter back to its normal position to thus eject the shaped dough article.

6. A device as claimed in claim 5 and further characterized in that said spring means comprises a pair of springs for each cutter, each spring extending from a cutter to attachment on the housing, one spring of each pair being longer than the other spring to normally bias the trailing cutting edge further from the center of the housing than the leading cutting edge.

7. A dough cutting device comprising a housing including spaced apart discs adapted to be rolled over a sheet of dough; a plurality of circumferentially spaced dough cutters pivotally mounted between said discs adjacent the outer peripheries thereof; each of said cutters comprising a ring-like element forming a continuous cutting edge to cut a dough article in the shape of said element; each of said cutters having a leading cutting edge and a trailing cutting edge; spring means extending from each of said cutters to attachment with said housing to normally space the trailing cutting edge of each cutter further from the center of the housing than the leading cutting edge whereby when the device is rolled over a sheet of dough, the cutting action will proceed from the leading edge of each cutter to the trailing edge thereof; said spring means deforming during cutting to accommodate the progressive cutting of dough from the leading edge to the trailing edge of each cutter and acting to subsequently return the cutters to their normal positions to thus eject the shaped dough articles.

References Cited in the file of this patent

UNITED STATES PATENTS

| | | |
|---|---|---|
| 477,278 | Snell | June 21, 1892 |
| 1,088,070 | Haines | Feb. 24, 1914 |
| 1,675,042 | Nelson | June 26, 1928 |
| 1,727,748 | Carney | Sept. 10, 1929 |

FOREIGN PATENTS

| | | |
|---|---|---|
| 14,817 | Great Britain | of 1910 |